(12) United States Patent
Han

(10) Patent No.: US 6,333,927 B1
(45) Date of Patent: Dec. 25, 2001

(54) DATA TRANSMISSION METHOD BETWEEN A BASE STATION CONTROLLER AND A BASE TRANSCEIVER STATION IN A DIGITAL MOBILE COMMUNICATION SYSTEM

(75) Inventor: Jin Soo Han, Kyoungki-do (KR)

(73) Assignee: Hyundai Electronics Ind. Co., LTD, Kyoungki-do (KR)

( * ) Notice: Subject to any disclaimer, the term of this patent is extended or adjusted under 35 U.S.C. 154(b) by 0 days.

(21) Appl. No.: 09/309,418

(22) Filed: May 11, 1999

(30) Foreign Application Priority Data

May 14, 1998 (KR) .................................................. 98-17417

(51) Int. Cl.[7] ...................................................... H04Q 7/28
(52) U.S. Cl. ........................................... 370/340; 455/123
(58) Field of Search ..................................... 370/340, 326, 370/327, 329, 335, 359, 252, 253, 254, 320, 332, 333, 342, 360, 419, 437, 441, 468, 479; 375/130, 236, 240; 455/125, 464, 509, 516, 525, 560, 200.1, 214, 220, 219, 123

(56) References Cited

U.S. PATENT DOCUMENTS 5,526,397 * 6/1996 Lohman ................................ 455/560
5,555,260 * 9/1996 Rinnback et al. .................... 370/347
5,598,416   1/1997 Yamada et al. ...................... 320/468
5,923,650 * 7/1999 Chen et al. ........................... 370/331
6,201,976 * 3/2001 Rasanen ............................... 455/557
6,229,793 * 6/2001 Jawanda ............................... 370/328

* cited by examiner

*Primary Examiner*—Douglas Olms
*Assistant Examiner*—Phirin Sam
(74) *Attorney, Agent, or Firm*—J. Harold Nissen; Lackenbach Siegel

(57) ABSTRACT

The present invention relates to a data transmission method between a base station controller (BSC) and a base transceiver station (BTS) in a digital mobile communication system, for varying a length of a frame according to a data transmission rate, thus improving transmission efficiency of a trunk between the BSC and BTS. When transmitting voice and data from the BSC to the BTS, a selection unit in the BSC generates a length-varied frame according to a transmission rate of a packet to be transmitted to the BTS and transmits the variable length frame to the BTS. Alternatively, when transmitting voice and data from the BTS to the BSC, a base station common processor in the BTS generates a length-varied frame according to a transmission rate of a packet to be transmitted to the BSC and transmits the variable length frame to the BSC. Therefore, the present invention can effectively use a channel bandwidth between the BTS and the BSC, thereby improving trunk efficiency.

10 Claims, 6 Drawing Sheets

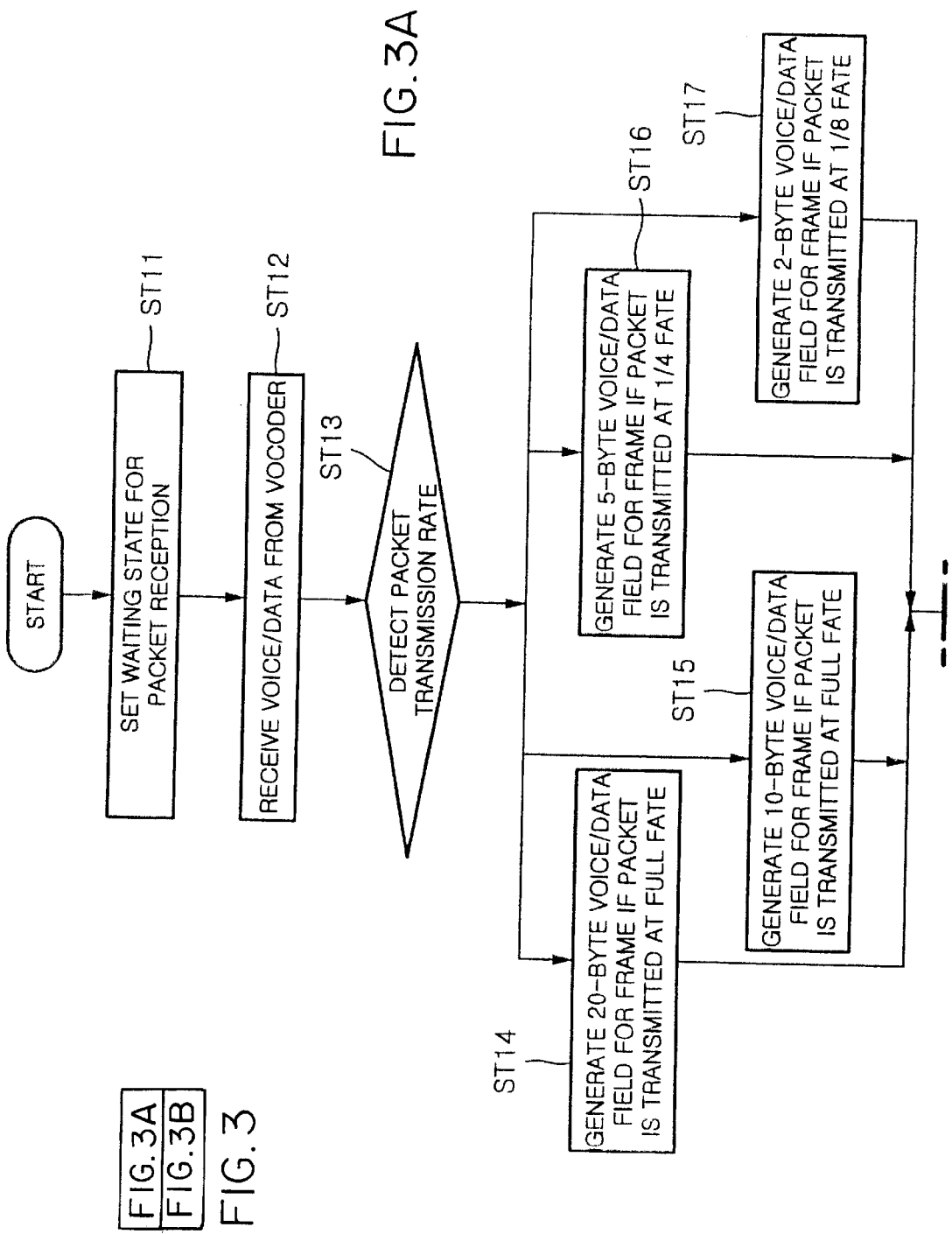

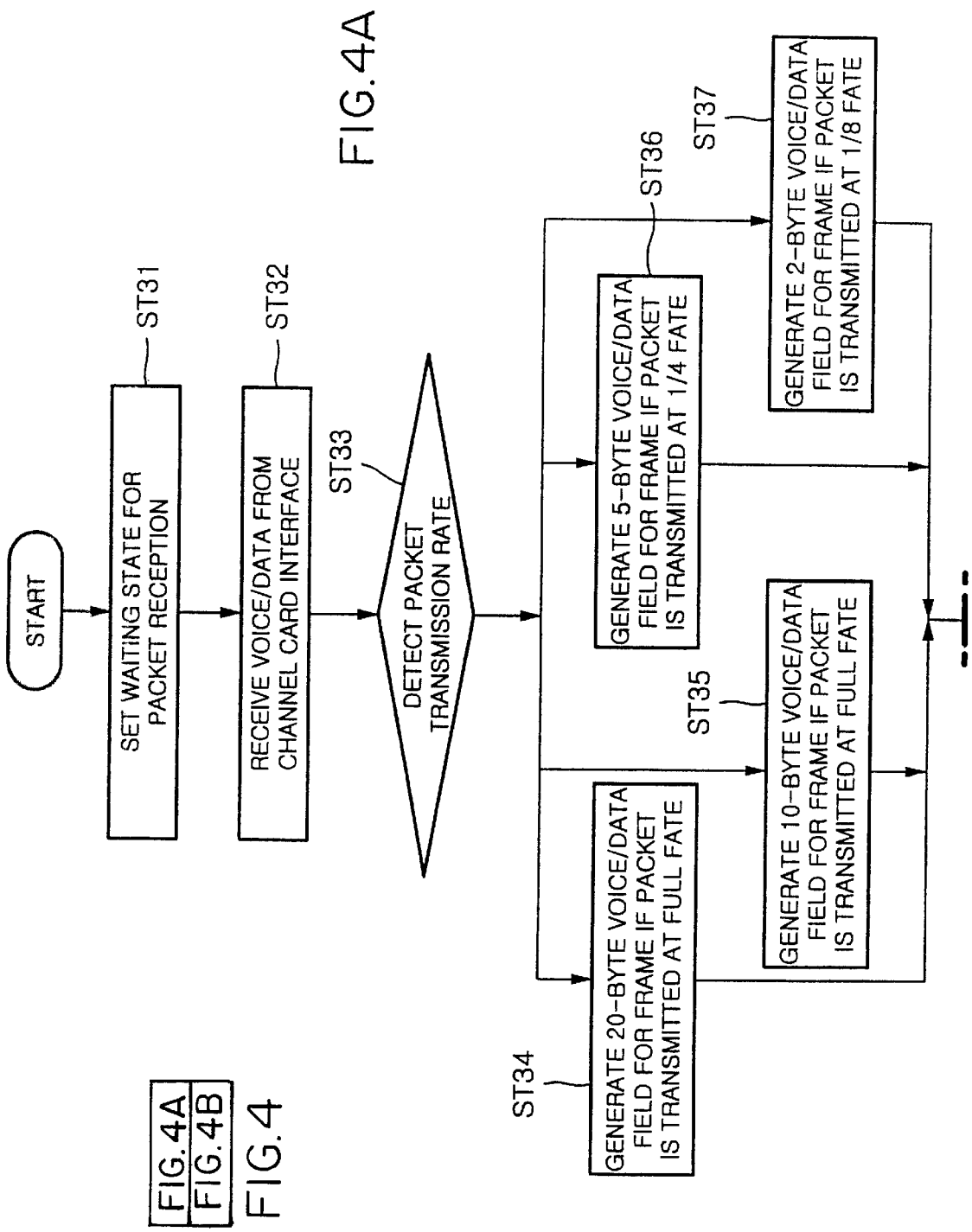

DATA TRANSMISSION METHOD BETWEEN A BASE STATION CONTROLLER AND A BASE TRANSCEIVER STATION IN A DIGITAL MOBILE COMMUNICATION SYSTEM

BACKGROUND OF THE INVENTION

1. Field of the Invention

The present invention relates to a data transmission method between a base station controller (BSC) and a base transceiver station (BTS) in a digital mobile communication system (such as a digital cellular system, a personal communication system, and a digital trunked radio system) employing a code division multiple access (CDMA) mode.

2. Description of Related Art

Generally, the digital mobile communication system applies to mobile objects such as a person, automobile, ship, train, and airplane.

FIG. 1 is a block diagram showing such conventional digital mobile communication system.

As shown in FIG. 1, the conventional digital mobile communication system comprises: mobile station (MS) 10 carried by a subscriber for wireless telecommunication; base transceiver station (BTS) 20 for receiving a call processing request from the MS 10 and transmitting a call transmission request from base station controller (BSC) 30 to the MS 10; BSC 30 for controlling the BTS 20 to perform the signal processing between the BTS 20 and mobile switching center (MSC) 40; and MSC 40 connected to the BSC 30 for transmitting the call processing request from the MS 10 via a public network or a private network to a public switching telephone network (PSTN) or advanced mobile phone service (AMPS) and another communication network to offer mobile communication service.

In this conventional mobile communication system, if a subscriber having his/her MS 10 attempts to use the mobile communication service within a service radius of the MSC 40, the MSC 40 catches the location of the MS 10 and operates to perform voice/facsimile information service according to the request of the MS 10 or connects the MS to another communication network to perform the mobile communication service.

FIG. 2 is a block diagram showing data transmission between the BSC 30 and the BTS 20.

As shown in FIG. 2, the BSC 30 comprises: vocoder 31 for compressing voice or data received from the MSC 40 to generate packets and transmitting voice or data received from the BTS 20 to the MSC 40; selection unit 32 for generating frames from the voice or data packets received from the vocoder 31 and analyzing frames received from the BTS 20; global positioning system (GPS) receiver 33 for receiving time/frequency from a GPS satellite and generating reference clocks for synchronization of the digital mobile communication system; and E1/T1 interface 34 for transmitting the frames received from the selection unit 32 via a trunk to the BTS 20 in synchronization with the reference clocks generated from the GPS receiver 33 and receiving the frames from the BTS 20.

The BTS 20 comprises: base station common processor (BCP) 21 for controlling frame transmission between the MS 10 and BSC 30, generating frames from voice or data received from the MS 10, and analyzing frames received from the BSC 30; channel card interface 22 corresponding to the vocoder 31 of the BSC 30 one to one, for modulating the frames received via an E1/T1 trunk from the BSC 30 according to control of the BCP 21 and demodulating voice or data received from the MS 10; GPS receiver 23 for receiving time/frequency from a GPS satellite and generating reference clocks for synchronization of the digital mobile communication system; and E1/T1 interface 24 for transmitting the frames generated from the BCP 21 via the E1/T1 trunk to the BSC 30 in synchronization with the reference clocks generated from the GPS receiver 23 and receiving the frames from the BSC 30 via the E1/T1 trunk.

The following description concerns how a high level data link control (HDLC) frame is transmitted via the E1/T1 trunk between the BSC 30 and BTS 20.

Primarily, transmission of frames from the BSC 30 to the BTS 20 is performed as follows. Once voice or data is transmitted from the MSC 40, the vocoder 31 in the BSC 30 receives the voice or data and compresses a transmission band to provide an output to the selection unit 32. At this time, the vocoder 31 transmits the voice or data to the selection unit 32 at a full rate if an amount of voice or data is received from the MSC 40. The vocoder 31 controls packet transmission according to a transmission rate of the voice or data to be transmitted to the selection unit 32. For example, if the transmission rate of the voice or data to be transmitted to the selection unit 32 is of the order of half the full rate, the vocoder 31 transmits a voice or data packet to the selection unit 32 at a half rate. In such manner, the voice or data is transmitted from the MSC 40 to the selection unit 32 via the vocoder 31 at different transmission rates, such as the full rate and transmission rates $\frac{1}{2}$, $\frac{1}{4}$, and $\frac{1}{8}$, depending upon circumstances.

When the voice or data packet is transmitted from the vocoder 31 at one of the different transmission rates, the selection unit 32 writes the voice or data packet onto a corresponding field in an HDLC frame to generate the frame. The selection unit 32 writes the received packet onto a voice/data field having a fixed length of 20 bytes regardless of the transmission rate of the voice or data packet and writes onto header and tail fields in the frame to generate the frame having a fixed length of 48 bytes. The generated frame of the fixed length is transmitted to the E1/T1 interface 34. The E1/T1 interface 34 transmits the frame via the E1/T1 trunk to the BTS 20 according to the reference clock output from the GPS receiver 33.

The same bandwidth is used when transmitting packets from the vocoder 31 to the BTS 20 at a low transmission rate such as the transmission rate $\frac{1}{8}$ and at the full rate. This results in waste of bandwidth in case of data transmission at the low rate such as the transmission rate $\frac{1}{8}$.

In other words, the conventional data transmission method between the BSC 30 and the BTS 20 using the E1/T1 trunk is a fixed rate non-channelized HDLC method, wherein the bandwidth of 2.048 Mbps used in case of the E1 and the bandwidth of 1.544 Mbps used in case of the T1 are shaped into the fixed length transmission frame of 48 bytes regardless of channels.

The E1 trunk has transmission capacity to transmit one frame per 20 msec, thus transmitting 2400 bytes (48*50) per 1 second in the 48-byte fixed length frame transmission. Therefore, the data transmission via the E1 trunk has the bandwidth of 19.2 kbps (2400*8) and the capacity of the trunk is 2048 kbps/19.2 kbps=106. Such transmission capacity of the E1 trunk is effected when the vocoder of 8 kbps is applied.

Once the fixed length frame from the BSC 30 is received by the E1/T1 interface 24 in the BTS 20 via the E1/T1 trunk, the base station common processor 21 analyzes the received fixed length frame. The channel card interface 22 modulates the analyzed data before transmitting it to the MS 10.

Next, the description on transmission of voice or data of the MS 10 from the BTS 20 to the BSC 30 in the 48-byte fixed length frame will be set forth. The 48-byte frame is generated at the base station common processor 21 in the BTS 20 and transmitted via the E1/T1 trunk to the BSC 30. The selection unit 32 in the BSC 30 then receives and analyzes the frame and transmits the analyzed voice or data to the vocoder 31 for transmission to the MSC 40.

In this case of transmitting the data from the BTS 20 to the BSC 30, the data is also transmitted in the form of the 48-byte fixed length frame.

As illustrated above, the conventional method of transmitting the data between the BSC and BTS in the mobile communication system using the E1/T1 trunk transmits the data in the form of a frame of the same length both when the voice or data is transmitted at the full rate and when the voice or data is transmitted at the low rate such as the transmission rate ⅛. Therefore, there is a problem of wasting the bandwidth when transmitting the data at other rates than the full rate.

Such waste of the bandwidth of the trunk results in lowering of transmission efficiency.

Additionally, when applying the vocoder of 13 kbps in association with the vocoder of 8 kbps, voice or data packets to be actually transmitted increase and the capacity of the trunk decreases in proportion to the packet increase, so it is required to additionally install a special trunk.

SUMMARY OF THE INVENTION

Accordingly, the present invention is directed to a data transmission method between a base station controller (BSC) and a base transceiver station (BTS) in a digital mobile communication system that substantially obviates one or more of the limitations and disadvantages of the related art.

An objective of the present invention is to provide a data transmission method between a BSC and a BTS in a digital mobile communication system, for varying a length of a frame according to a data transmission rate, thus improving transmission efficiency of a trunk between the BSC and BTS.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a data transmission method between the BSC and the BTS in the digital mobile communication system, comprises the steps of: when transmitting data from the BSC to the BTS via a trunk, at a selection unit, receiving a voice or data packet from a vocoder in the BSC and detecting a transmission rate of the packet; at the selection unit, varying a length of a voice/data field according to the detected transmission rate of the packet; and at the selection unit, generating a length-varied frame from the varied voice/data field and a common field essentially required for the frame and transmitting the generated frame to the BTS via an E1/T1 interface.

The data transmission method further comprises the step of: if an acknowledgement signal of frame reception is received from the BTS after transmitting the generated frame to the BTS, checking to find whether or not there are any voice/data packets to be received from the vocoder at the selection unit, and going back to the step of detecting the transmission rate if there are any packets to be received and terminating the data transmission if there are no packets to be received.

The transmission rate is information written onto a predetermined area within the voice/data field of a receiving packet, and "00" is written for a full rate, "01" is written for a rate ½, "10" is written for a rate ¼, and "11" is written for a rate ⅛.

In another aspect, the present invention provides a data transmission method between the BSC and the BTS in a digital mobile communication system, comprises the steps of: when transmitting data from the BTS to the BSC via a trunk, at a base station common processor, receiving a voice or data packet from a channel card interface in the BTS and detecting a transmission rate of the packet; at the base station common processor, varying a length of a voice/data field according to the detected transmission rate of the packet to generate the voice/data field; and at the base station common processor, generating a length-varied frame from the varied voice/data field and a common field essentially required for the frame and transmitting the generated frame to the BSC via an E1/T1 interface.

The data transmission method further comprises the step of: if an acknowledgement signal of frame reception is received from the BSC after transmitting the generated frame to the BSC, checking to find whether or not there are any voice/data packets to be received from the channel card interface at the base station common processor, and going back to the step of detecting the transmission rate if there are any packets to be received and terminating the data transmission if there are no packets.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Figure 1:
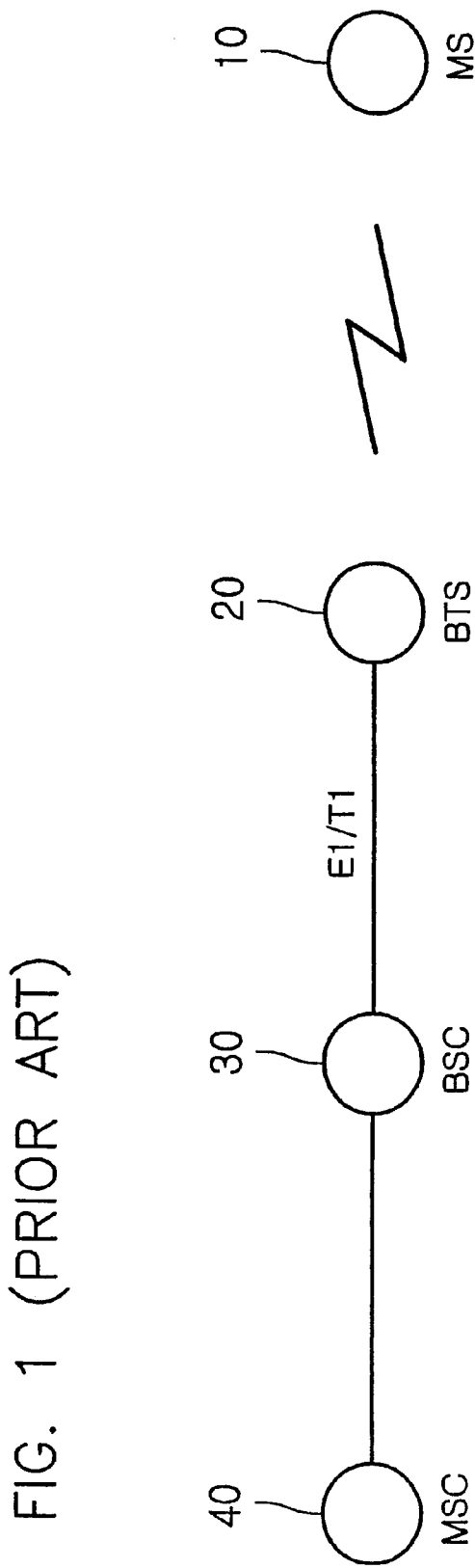
FIG. 1 is a block diagram showing a conventional digital mobile communication system.
Figure 2:
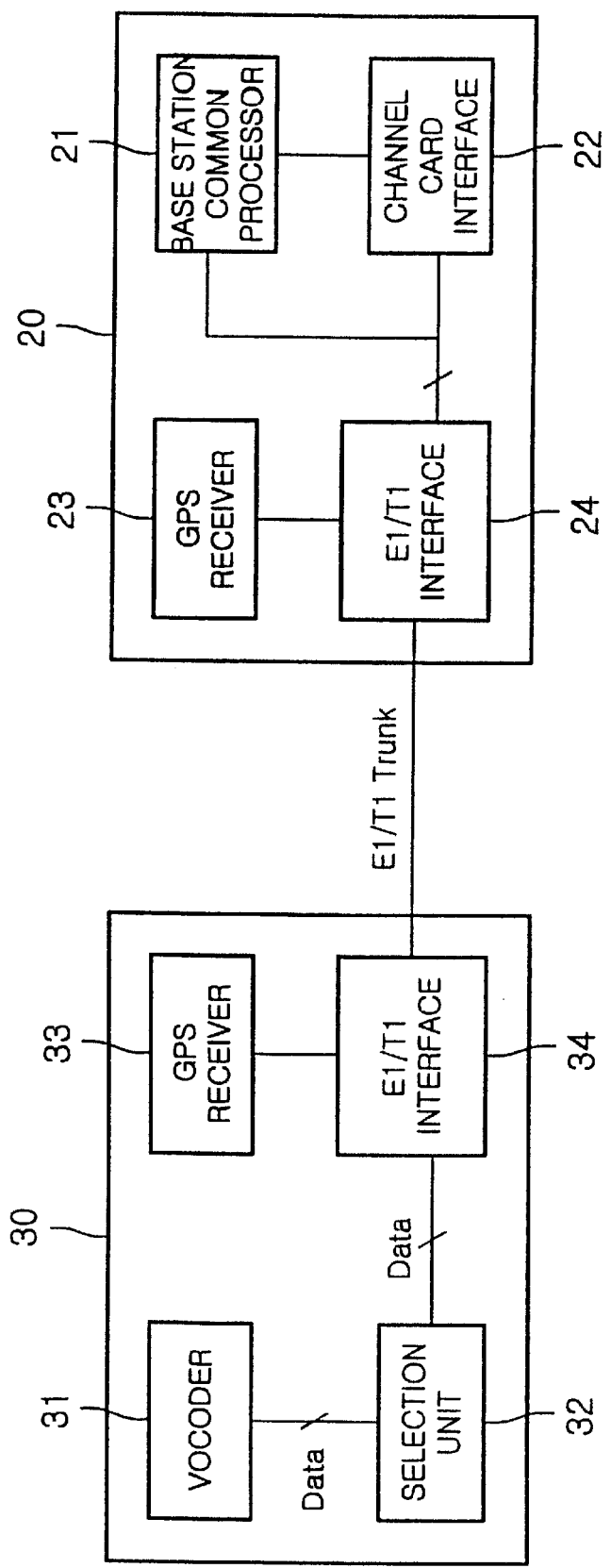
FIG. 2 is a block diagram showing internal configurations of a BSC and a BTS where the present invention will be applied.

Reference will now be made in detail to the preferred embodiments of the present invention, examples of which are illustrated in the accompanying drawings.

The preferred embodiments of the present invention according to the above technical idea will now be described in detail with reference to the accompanying drawings.

The method of transmitting a frame via an E1/T1 trunk between a BSC and a BTS in a digital mobile communication system according to the present invention is not a fixed rate non-channelized transmission method (of forming one channel for one line instead of splitting one line into multiple channels and transmitting data at a fixed rate) but a variable rate non-channelized method (of forming one channel for one line instead of splitting one line into multiple channels and transmitting data at a variable rate). According to this variable rate non-channelized transmission method, length of a frame is variably generated according to different transmission rates for the transmission. The following description concerns the variable length frame.

TABLE 1

| 1 | 2 | 3 | 4 | 5 | 6 |
| --- | --- | --- | --- | --- | --- |

1: frame control field
2: traffic channel gain field
3: power control sub channel gain field
4: reserved field
5: power control threshold field
6: voice/data field The frame shown in the Table 1 is a general one transmitted from the selection unit in the BSC 30 to the channel card interface 22 in the BTS 20. The frame control field 1 contains information on the frame such as a type, characteristic, and size of data. The traffic channel gain field 2 contains information on strength of power when a data signal is forwarded to the air from a channel card in the BTS 20.

The power control sub channel gain field 3 is a power control bit field for controlling the power for a sub channel. The reserved field 4 is a redundant field prepared for information that can be required afterward. The power control threshold field 5 is a field for record of reference power during power control.

The voice/data field 6 contains voice or data to be substantially transmitted and transmission rate information (e.g., "00" indicative of the full rate, "01" indicative of the rate ½, "10" indicative of the rate ¼, and "11" indicative of the rate ⅛) at a predetermined location in the field. The present invention varies the length of the voice/data field 6 depending upon the information transmission rate. Specifically, if the voice or data is transmitted at the full rate, the voice/data field 6 in the frame is designed to have 20 bytes. If the voice or data is transmitted at the rate ½, the voice/data field 6 of 10 bytes is generated. If the voice or data is transmitted at the rate ¼, the voice/data field 6 of 5 bytes is generated. If the voice or data is transmitted at the rate ⅛, the voice/data field 6 of 2 bytes is generated. The maximum length of the frame is generated in case of the full rate and is 48 bytes (20-byte voice/data field+28-byte common field). The minimum length of the frame is generated in case of the rate ⅛ and is 30 bytes (2-byte voice/data field+28-byte common field).

The "common field" is a term for integrating other fields (the frame control field, traffic channel gain field, power control sub channel gain field, reserved field, and power control threshold field) than the voice/data field.

The following Table 2 shows a structure of a frame transmitted from the channel card interface in the BTS 20 and received by the selection unit 32 in the BSC 30.

TABLE 2

| 11 | 12 | 13 | 14 | 15 |
| --- | --- | --- | --- | --- |

11: frame control field
12: quality matrix
13: energy
14: power control pattern
15: voice/data field The received frame, as shown in Table 2, comprises frame control field 11, quality matrix 12, energy 13, power control pattern 14, and voice/data field 15. The frame control field 11 contains information on the frame such as a type, characteristic, and size of data. The quality matrix 12 contains information on reference power during power control. The energy field 13 contains energy information from the channel card interface 22. The power control pattern 14 contains pattern information of power control bits.

The voice/data field 15 contains substantial voice or data received from the channel card interface 22 in the BTS 20 and transmission rate information notifying the transmission rate (e.g., "00" indicative of the full rate, "01" indicative of the rate ½, "10" indicative of the rate ¼, and "11" indicative of the rate ⅛) at a predetermined location in the field. The present invention varies the length of the voice/data field, thus varying the length of the frame when transmitting the data from the BTS 20 to the BSC 30.

Figure 3B:
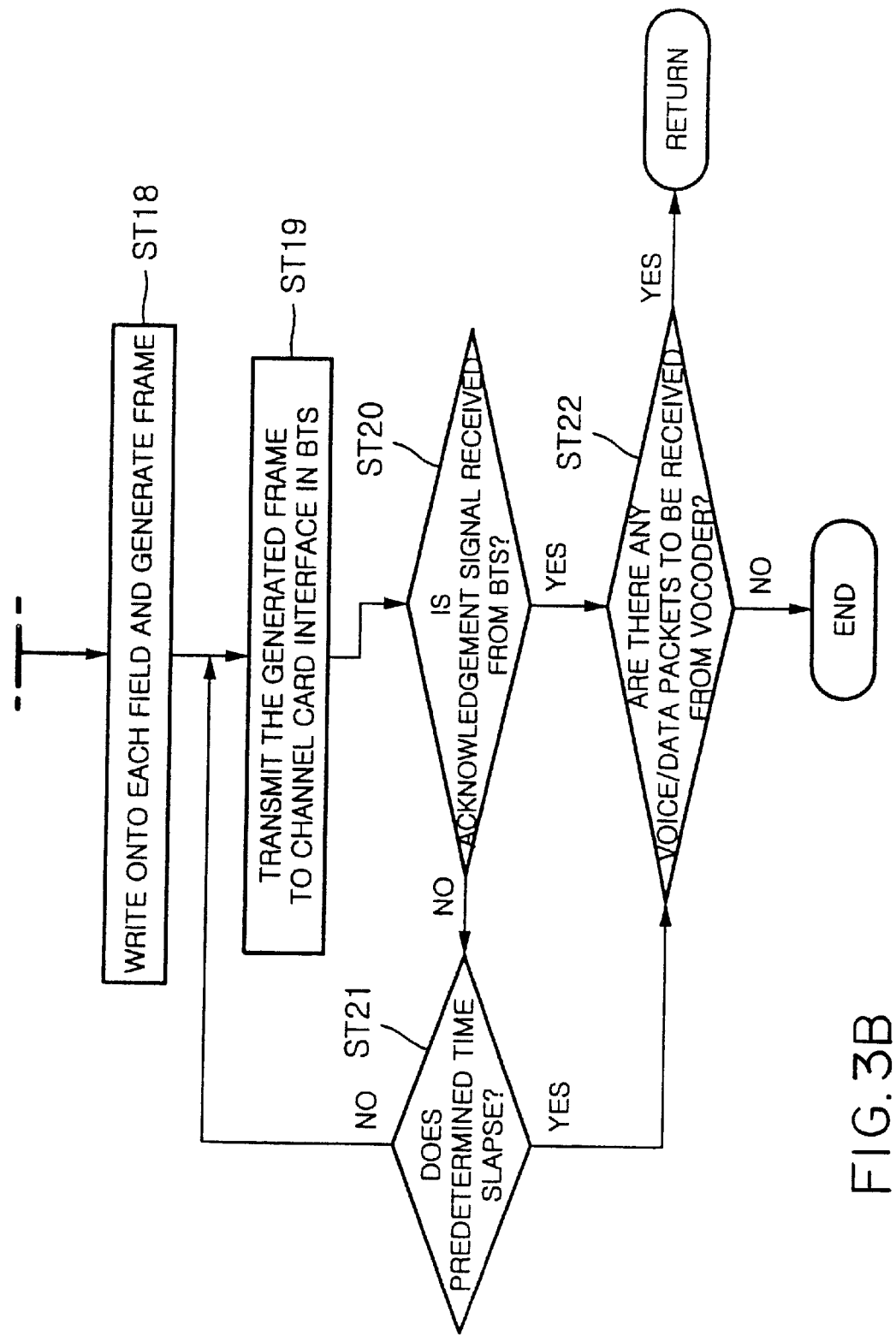
FIG. 3 is a flow chart how data is transmitted from a BSC to a BTS in a digital mobile communication system according to the present invention.

FIG. 3 is a flow chart showing how data is transmitted from the BSC to the BTS in the digital mobile communication system according to the present invention.

As shown in FIG. 3, once a voice or data packet is received from the vocoder 31 in the BSC 30, the selection unit 32 detects transmission rate information of the packet (ST11~ST13). The selection unit 32 then varies a length of the voice/data field according to the detected transmission rate of the packet (ST14~ST17). The selection unit 32 generates a length-varied frame with the varied voice/data field and a common field essentially necessary for the frame and transmits the generated frame to the BTS 20 (ST18~ST19). After transmitting the generated frame to the BTS 20, if an acknowledgement signal of the frame reception is received from the BTS 20, the vocoder 31 is checked to find whether or not there are any voice/data packets to be transmitted. When there are any packets to be transmitted, the progress goes back to the step of detecting the transmission rate. When there are no packets, the data transmission ends (ST20~ST22).

The step of varying the length of the voice/data field comprises the steps of: generating a 20-byte voice/data field if the transmission rate of the packet to be transmitted to the BTS is the full rate as a result of the detection of the transmission rate (ST14); generating a 10-byte voice/data field if the transmission rate of the packet to be transmitted to the BTS is the half rate as a result of the detection of the transmission rate (ST15); generating a 5-byte voice/data field if the transmission rate of the packet to be transmitted to the BTS is the rate ¼ as a result of the detection of the transmission rate (ST16); and generating a 2-byte voice/data field if the transmission rate of the packet to be transmitted to the BTS is the rate ⅛ as a result of the detection of the transmission rate (ST17).

The method of varying the length of a frame according to the transmission rate and transmitting the data between the BSC and the BTS is as follows.

Primarily, the selection unit 32 waits for reception of a voice or data packet from the vocoder 31 in the BSC 30 (ST11). When the vocoder 31 receives voice or data from the MSC 40, the received voice or data is provided to the selection unit 32 (ST12). The selection unit 32 receives the received voice or data and detects a transmission rate at which a voice or data packet is transmitted (ST13).

As a result of the detection, if it is determined that the packet is transmitted at the full rate because the vocoder 31 has too much information to transmit, the selection unit 32 generates a 20-byte voice/data field 6 for the frame as shown in Table 1 and writes the received voice or data onto the field (ST14).

As the result of the detection, if it is determined that the packet is transmitted at the half rate corresponding to ½ of the full rate, the selection unit 32 generates a 10-byte voice/data field 6 and writes the received voice or data onto the field (ST15).

As the result of the detection, if it is determined that the packet is transmitted at ¼ of the full rate, the selection unit 32 generates a 5-byte voice/data field 6 and writes the received voice or data onto the field (ST16).

As the result of the detection, if it is determined that the voice or data packet is transmitted to the BTS 20 at ⅛ of the full rate, the selection unit 32 generates a 2-byte voice/data field 6 and writes the received voice or data onto the field (ST17).

In the conventional technique, the 20-byte voice/data field for the frame is generated when the voice or data is transmitted at the full rate and the same 20-byte voice/data field for the frame is generated when the voice or data is transmitted at the low transmission rate such as the rate ⅛, thereby wasting a transmission bandwidth of the trunk.

On the other hand, the present invention varies the length of the voice/data field according to the transmission rate so as to vary the overall length of the frame, so a narrower bandwidth is assigned when the voice or data is transmitted at the low transmission rate such as the rate ⅛, thereby preventing the waste of the channel bandwidth of the E1/T1 trunk between the BSC 30 and the BTS 20. Therefore, the present invention can improve the transmission efficiency of the trunk between the BSC 30 and the BTS 20.

After the voice/data field is varied and generated according to the transmission rate of the packet received from the vocoder 31, the selection unit 32 combines the voice/data field with the other fields 1~5 shown in the Table 1 to generate a transmitting frame (ST18). The length of the overall frame of the full rate is 48 bytes including the 20-byte voice/data field 6. The length of the overall frame of the rate ½ is 38 bytes. The length of the overall frame of the rate ¼ is 33 bytes. The length of the overall frame of the rate ⅛ is 30 bytes.

The selection 32 transmits the frame generated to have the length that is varied according to the transmission rate to the E1/T1 interface 34 for transmission via the E1/T1 trunk to the E1/T1 interface 24 in the BTS 20 (ST19).

On receiving the variable frame via the E1/T1 trunk in the BTS 20, the base station common processor 21 analyzes the variable frame and the channel card interface 32 processes and modulates a baseband signal. The base station common processor 21 in the BTS 20 transmits the acknowledgement signal of the received frame (ST20). In response to the acknowledgement signal, the selection unit 32 in the BSC 30 checks to find whether there are more voice or data packets to be received from the vocoder 31 (ST22).

If the selection unit 32 in the BSC 30 does not receive the acknowledgement signal of the transmitted frame from the BTS 20, it checks to find whether or not a predetermined time elapses (ST21). If the predetermined time does not elapse, the generated variable frame is re-transmitted to the BTS 20. If the acknowledgement signal of the transmitted frame is not received from the BTS 20 within the predetermined time, the selection unit 32 in the BSC 30 checks to find whether or not there are any voice or data packets to be received from the vocoder 31 for transmission of the next frame (ST22).

If there are any voice or data packets to be received from the vocoder 31, the selection unit 32 goes to the waiting state for reception. Alternatively, if there are no voice or data packets to be received, the frame transmitting operation ends.

Figure 4B:
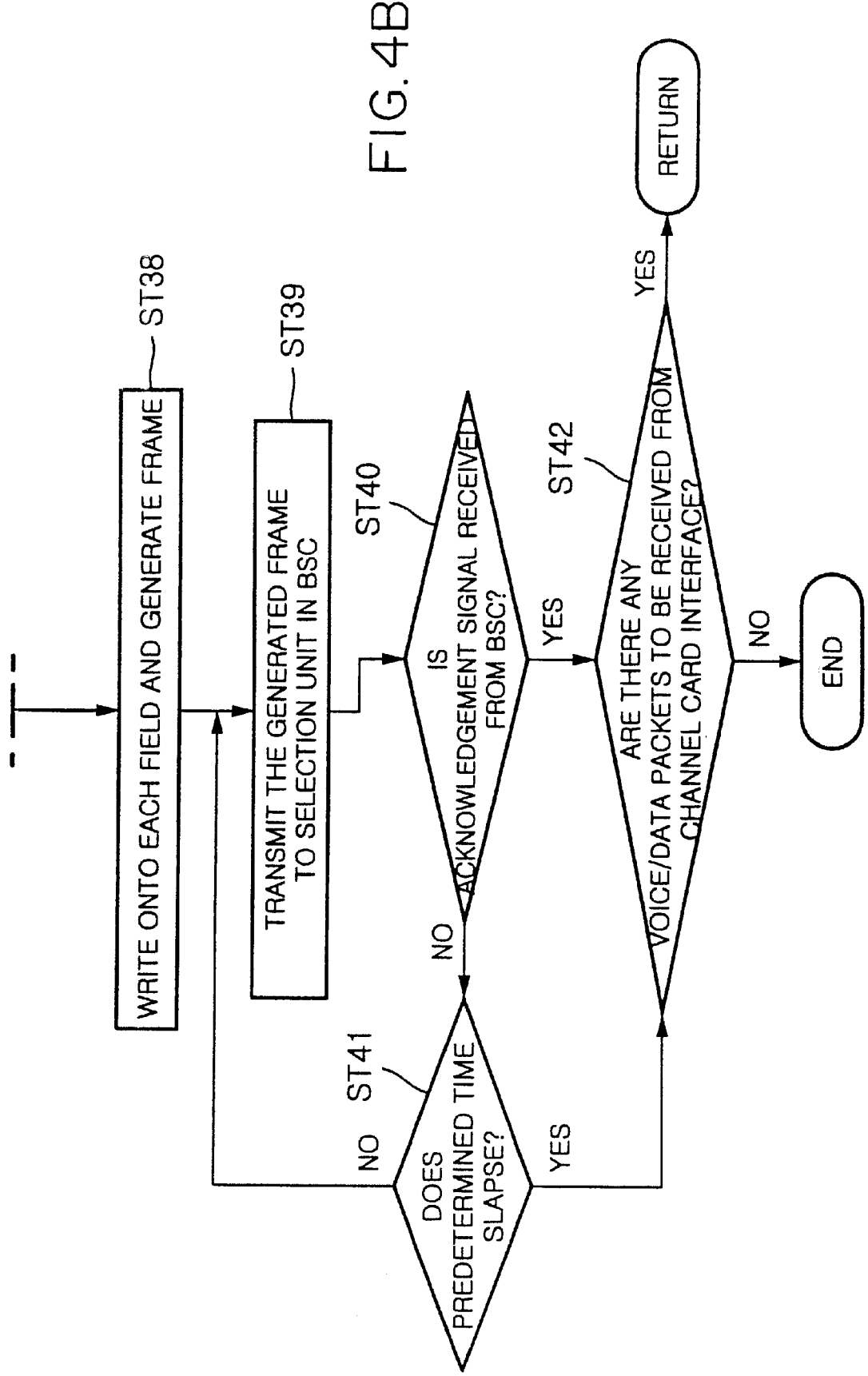
FIG. 4 is a flow chart how data is transmitted from the BTS to the BSC in the digital mobile communication system according to the present invention.

FIG. 4 is a flow chart showing how data is transmitted from the BTS to the BSC in the digital mobile communication system according to the present invention.

As shown in FIG. 4, the data transmission from the BTS to the BSC comprises the steps of: detecting the transmission rate of a voice or data packet on receiving the packet from the channel card interface 22 in the BTS 20 (ST31~ST33); at the base station common processor, varying the length of a voice/data field according to the detected transmission rate of the packet (ST34~ST37); generating a length-varied frame from the varied voice/data field and a common field essentially necessary for the frame and transmitting the generated frame to the BSC 30 (ST38~ST39); after transmitting the generated frame to the BSC 30, checking to find whether or not there are any voice/data packets to be received from the channel card interface 22 if an acknowledgement signal of the frame reception is received from the BSC 30, and returning to the step of detecting the transmission rate if there are any packets to be received and terminating the data transmission if there are no packets to be received (ST40~ST42).

The step of varying the length of the voice/data field comprises the steps of: generating a 20-byte voice/data field if it is determined that the packet to be transmitted from the BTS 20 to the BSC 30 is transmitted at the full rate as a result of the detection of the transmission rate (ST34); generating a 10-byte voice/data field if it is determined that the packet is transmitted at half of the full rate as the result of the detection of the transmission rate (ST35); generating a 5-byte voice/data field if it is determined that the packet is transmitted at ¼ of the full rate as the result of the detection of the transmission rate (ST36); and generating a 2-byte voice/data field if it is determined that the packet is transmitted at ⅛ of the full rate as the result of the detection of the transmission rate (ST37).

The data transmission from the BTS to the BSC in the digital mobile communication system according to the present invention will now be described in detail. Primarily, the base station common processor 21 waits for reception of a voice or data packet from the channel card interface 22 (ST31). The base station common processor 21 then receives the voice or data packet to be transmitted to the BSC 30 (the voice or data received from the MS) from the channel card interface 22 (ST32) and detects the transmission rate of the packet (ST33).

The length of a voice/ data field is variably generated in the same method as the method of varying the length of the voice/data field according to the transmission rate at the selection unit 32 in the BSC 30 (ST34~ST37).

Namely, if the transmission rate of the packet to be transmitted from the BTS 20 to the BSC 30 is the full rate as a result of the detection of the transmission rate, a 20-byte voice/data field is generated (ST34). If the transmission rate of the packet is half of the full rate as the result of the detection, a 10-byte voice/data field is generated (ST35). If the transmission rate of the packet is the ¼ of the full rate as the result of the detection, a 5-byte voice/data field is generated (ST36). If the transmission rate of the packet is the ⅛ of the full rate as the result of the detection, a 2-byte voice/data field is generated (ST37).

Once the voice/data field 15 is generated in such manner described above, the base station common processor 21 in the BTS 20 generates the other fields 11~14 shown in Table 2 and combines the other fields 11~14 with the voice/data field 15 to generate a length-varied frame (ST38).

The length of the variable frame generated at the base station common processor 21 can be minimum 30 bytes to maximum 48 bytes.

After generating the frame to be transmitted from the BTS 20 to BSC 30, the base station common processor 21 transmits the length-varied frame via the E1/T1 trunk to the BSC 30.

If the length of the frame to be transmitted from the BTS 20 to the BSC 30 is varied according to the transmission rate, a maximum bandwidth is assigned at the high transmission rate and a narrower bandwidth is assigned at the low transmission rate, so that the transmission efficiency of the E1/T1 trunk can be improved.

Once receiving the frame from the BTS 20, the selection unit 32 in the BSC 30 analyzes the frame and transmits an acknowledgement signal of the received variable frame to the BTS 20.

On receiving the acknowledgement signal of the frame reception from the BSC 30 within a predetermined time after transmitting the variable frame (ST40~ST41), the base station common processor 21 in the BTS 20 checks to find whether or not there are any voice or data packets received from the channel card interface 22. If there is no voice or data received, the operation of transmitting frames to the BSC 30 ends.

If the acknowledgement of the frame reception is not received within the predetermined time after the variable frame is transmitted to the BSC 30 or if there is any data to be transmitted to the BSC 30 in the channel card interface 22, the progress returns to the step of waiting for packet reception (ST31) to transmit the next frame.

As illustrated above, the present invention varies the length of the voice/data field according to the data transmission rate thus varying the overall length of the frame, so the narrower bandwidth can be used for the voice or data transmitted at the low rate, thereby preventing the waste of bandwidth.

Specifically, the conventional data transmission method of generating a fixed length frame and transmitting it via the E1/T1 trunk applies a statistic generation rate of 50% to the full rate, 25% to the rate ½, and 25% to the rate ⅛ and assigns the fixed length of 20 bytes to the voice/data field regardless of the transmission rate, so the volume of transmission data is calculated as follows: (50%*1)+(25%*1)+ (25%*1)=100%. The transmission rates are multiplied by "1" in the above calculation because the 20 bytes corresponding to the full rate is assigned to all frame structures regardless differences in transmission rates.

However, when varying the length of the voice/data field according to the transmission rate thus varying the length of the frame according to the present invention, an information transmission rate of 1 is applied to the full rate because a 20-byte is assigned to the voice/data field, ½ is applied to the rate ½ because a 10-byte is assigned to the voice/data field, and ⅛ is applied to the rate ⅛ because a 2-byte is assigned.

The transmission rate ¼ hardly occurs in an actual system, so it is excluded from a calculation.

The volume of transmission data according to the present invention is calculated as follows: (50%*1)+(25%*½)+ (25%*⅛)=66%.

Consequently, according to the present invention, the volume of data to be transmitted decreases by 37% and, relatively, transmission capacity increases by 37%. Trunk capacity is 2048 kbps/19.2 kbps=106 channels according to the conventional art. On the other hand, the present invention has the trunk capacity of 2048 kpas/(19.2 kbps*66/ 100)=161 channels.

In this specification, the data transmission method of transmitting voice or data from BSC to BTS via the E1/T1 trunk and transmitting voice or data from BTS to BSC via the E1/T1 trunk is described, but the present invention is not limited to this. The present invention can be applied to all data transmission system for transmitting data using the E1/T1 trunk.

As described above, the present invention varies the length of a frame according to the data transmission rate before transmission, thereby improving the transmission efficiency of the trunk between BTS and BSC.

Due to the improvement of the transmission efficiency of the trunk, additional installation of trunks is not required even when intending to increase accommodative capacity of the vocoder, thereby cutting down on system installation costs.

The improvement of the transmission efficiency of the trunk between BTS and BSC is supposed to enhance the ability of communicating information between BTS and BSC.

It will be apparent to those skilled in the art that various modifications and variations can be made in the data transmission method between BTS and BSC in the digital mobile communication system of the present invention without deviating from the spirit or scope of the invention. Thus, it is intended that the present invention covers the modifications and variations of this invention provided they come within the scope of the appended claims and their equivalents.

What is claimed is:

1. A data transmission method between a base station controller (BSC) and a base transceiver station (BTS) in a digital mobile communication system, said method comprising the steps of:
   when transmitting data from the BSC to the BTS via a trunk,
   at a selection unit, receiving a voice or data packet from a vocoder in said BSC and detecting a transmission rate of the packet;
   at said selection unit, varying a length of a voice/data field according to the detected transmission rate of said packet; and
   at said selection unit, generating a length-varied frame from the varied voice/data field and a common field essentially required for the frame and transmitting the generated frame to said BTS via an E1/T1 interface.

2. The data transmission method according to claim 1, said transmission rate is information written onto a predetermined area within the voice/data field of a receiving packet, and "00" is written for a full rate, "01" is written for a rate ½, "10" is written for a rate ¼, and "11" is written for a rate ⅛.

3. The data transmission method according to claim 1, further comprising the step of: if an acknowledgement signal of frame reception is received from the BTS after transmitting the generated frame to the BTS, checking to find whether or not there are any voice/data packets to be received from the vocoder at the selection unit, and going back to the step of detecting the transmission rate if there are any packets to be received and terminating the data transmission if there are no packets to be received.

4. The data transmission method according to claim 1, wherein said step of detecting the transmission rate of the packet comprises the steps of:

detecting transmission rate information written onto a predetermined location within the voice/data field and generating a 20-byte voice/data field if the packet is transmitted from the BSC to the BTS at a full rate as a result of the detection of the transmission rate;

generating a 10-byte voice/data field if the packet is transmitted at ½ of the full rate as the result of the detection;

generating a 5-byte voice/data field if the packet is transmitted at ¼ of the full rate as the result of the detection; and generating a 2-byte voice/data field if the packet is transmitted at ⅛ of the full rate as the result of the detection.

5. The data transmission method according to claim 1, wherein the length of said generated frame is 48 bytes when the packet transmission rate is a full rate, 38 bytes in case of the transmission rate ½, 33 bytes in case of the transmission rate ¼, and 30 bytes in case of the transmission rate ⅛.

6. A data transmission method between a base station controller (BSC) and a base transceiver station (BTS) in a digital mobile communication system, said method comprising the steps of:

when transmitting data from the BTS to the BSC via a trunk, at a base station common processor, receiving a voice or data packet from a channel card interface in said BTS and detecting a transmission rate of the packet;

at said base station common processor, varying a length of a voice/data field according to the detected transmission rate of said packet to generate the voice/data field; and at said base station common processor, generating a length-varied frame from the varied voice/data field and a common field essentially required for the frame and transmitting the generated frame to said BSC via an E1/T1 interface.

7. The data transmission method according to claim 6, said transmission rate is information written onto a predetermined area within the voice/data field of a receiving packet, and "00" is written for a full rate, "01" is written for a rate ½, "10" is written for a rate ¼, and "11" is written for a rate ⅛.

8. The data transmission method according to claim 6, further comprising the step of: if an acknowledgement signal of frame reception is received from the BSC after transmitting the generated frame to the BSC, checking to find whether or not there are any voice/data packets to be received from said channel card interface at the base station common processor, and going back to the step of detecting the transmission rate if there are any packets to be received and terminating the data transmission if there are no packets.

9. The data transmission method according to claim 6, wherein said step of detecting the transmission rate of the packet comprises the steps of:

generating a 20-byte voice/data field if the packet is transmitted from the BTS to the BSC at a full rate as a result of the detection of the transmission rate;

generating a 10-byte voice/data field if the packet is transmitted at ½ of the full rate as the result of the detection;

generating a 5-byte voice/data field if the packet is transmitted at ¼ of the full rate as the result of the detection; and generating a 2-byte voice/data field if the packet is transmitted at ⅛ of the full rate as the result of the detection.

10. The data transmission method according to claim 6, wherein the length of said generated frame is 48 bytes when the packet transmission rate is a fill rate, 38 bytes in case of the transmission rate ½, 33 bytes in case of the transmission rate ¼, and 30 bytes in case of the transmission rate ⅛.

* * * * *